(12) United States Patent
McMichael

(10) Patent No.: US 6,386,639 B1
(45) Date of Patent: May 14, 2002

(54) BABY SUPPORT

(76) Inventor: Mary C. McMichael, 3823 Olympia La., Island Lake, IL (US) 60042

( * ) Notice: Subject to any disclaimer, the term of this patent is extended or adjusted under 35 U.S.C. 154(b) by 29 days.

(21) Appl. No.: 09/594,428

(22) Filed: Jun. 15, 2000

(51) Int. Cl.[7] .......................... A62B 35/00; B60R 22/00
(52) U.S. Cl. ................... 297/464; 297/393; 297/219.12; 297/250.1
(58) Field of Search ........................ 297/393, 219.12, 297/250.1, 464

(56) References Cited

U.S. PATENT DOCUMENTS

| | | | |
|---|---|---|---|
| 2,638,293 A | * 5/1953 | Lindstrom | ............... 297/393 X |
| 4,383,713 A | 5/1983 | Roston | |
| 4,434,513 A | 3/1984 | Welch | |
| 4,679,263 A | * 7/1987 | Honer | ................. 297/393 X |
| 4,695,092 A | 9/1987 | Hittle | |
| 4,707,031 A | * 11/1987 | Meistrell | .................... 297/393 |
| 4,776,049 A | 10/1988 | Perron | |
| 4,779,930 A | 10/1988 | Rosen | |
| 5,056,533 A | * 10/1991 | Solano | .............. 297/219.12 X |
| 5,228,745 A | 7/1993 | Hazel | |
| 5,310,245 A | 5/1994 | Lyszczasz | |
| 5,339,472 A | 8/1994 | Yin | |
| 5,383,711 A | 1/1995 | Houghteling | |
| 5,486,037 A | 1/1996 | Harper | |
| 5,511,854 A | * 4/1996 | Cordia | ..................... 297/393 |
| 5,586,351 A | 12/1996 | Ive | |
| 5,735,576 A | 4/1998 | Pepys et al. | |
| 5,765,893 A | 6/1998 | Ziegler | |
| 5,842,739 A | 12/1998 | Noble | |
| 5,979,981 A | 11/1999 | Dunne et al. | |
| 5,988,752 A | 11/1999 | Richards | |
| 6,038,720 A | 3/2000 | Matthews et al. | |
| 6,082,826 A | * 7/2000 | Moreno | ..................... 297/464 |
| 6,139,100 A | * 10/2000 | Baskin-Lockman et al. | ..... 297/250.1 |
| 6,209,959 B1 | * 4/2001 | Meye | ........................ 297/393 |

* cited by examiner

Primary Examiner—Beth A. Stephan
Assistant Examiner—Brian E. Glessner
(74) Attorney, Agent, or Firm—Mathew R. P. Perrone, Jr.

(57) ABSTRACT

A head support cooperates with an infant seat or a child seat, in order to render the infant or child more comfortable by supporting the head with padding and a head covering device.

16 Claims, 4 Drawing Sheets

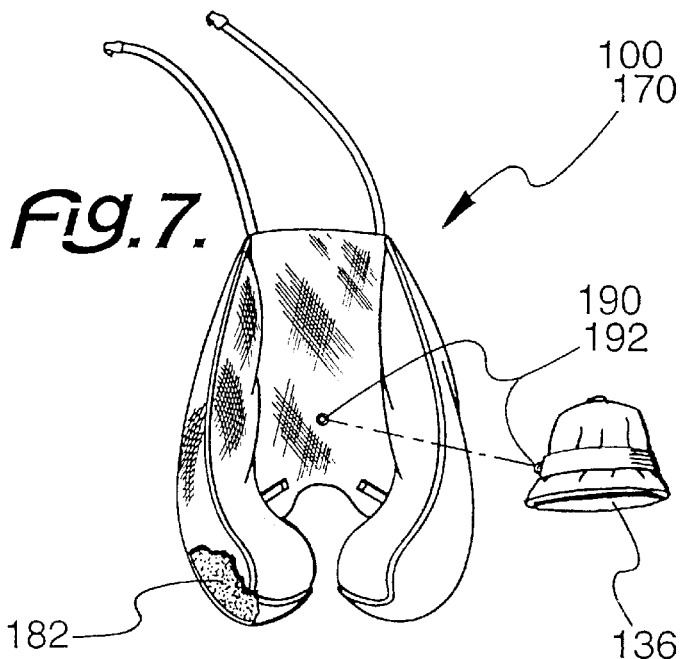
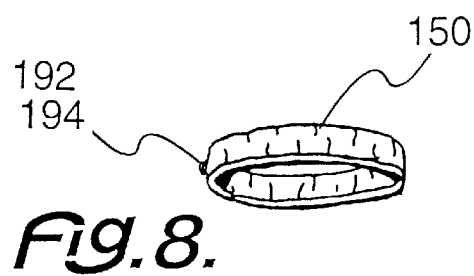
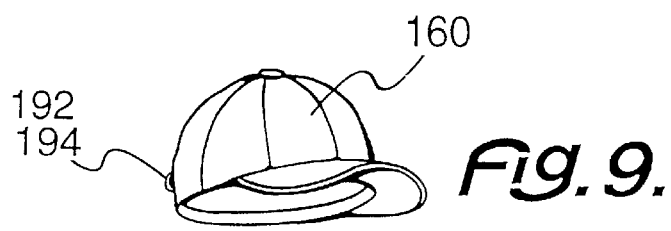

BABY SUPPORT

This invention relates to a baby support and more particularly to a baby support adapted to cooperate with a baby seat or toddler seat and support the head of the child therein in a comfortable manner.

BACKGROUND OF THE INVENTION

For a person having a weight under about eighteen kilograms (forty pounds), an additional support mechanism is required for comfortable and safe transportation of that relatively light weight person in a vehicle. More particularly, for a baby, infant, toddler or child up to that weight, safety demands an appropriate car or booster seat.

The car seats or booster seats of the prior art lack head support. Yet head support is critical for comfort. A child needs support for his or her head while riding in a vehicle. If the head is supported, a child may fall asleep in more natural and comfortable position. Such a desired position can minimize undue stress on various body parts, especially the neck of an infant or child.

To develop a support mechanism in order to obtain a comfortable position for a child is difficult. Such a support mechanism must be easily attachable to a child and the supporting, while being easily releasable from the child to be effective. Such a balance is difficult to achieve.

This proper position, for comfort from a support mechanism, is also believed to increase safety for the child riding in a vehicle. Improper head movement can result in severe injuries, especially in a child. Because the child is still in the formative years, such injuries can be more severe, even if the force of movement can be described as minimal for an adult.

Both front to back and side to side movement due to excessive force such as that caused by a vehicle accident can severely injure an infant or toddler. It is especially desired to minimize that movement in toddler or infant. To accomplish this is a major problem. There must be discovered a system for achieving these desired results.

With the studies of child safety now published, it is known that supporting a child within a vehicle is very critical. Firstly, that the infants or babies must be supported in a certain fashion is most certainly. Secondly, the toddlers or youngsters weighing less than eighteen kilograms or about forty pounds do not fit in the standard seatbelts of a vehicle. Some sort of booster seat is needed.

The major defect in these booster seats or toddler seats is lack of head support. In case of an accident, with the head being the dominate part of the body especially for a child, the child's neck can be cracked like a whip by severe head movement, which can cause some damage to the neck and other injuries to the body. Accordingly, it is desired to support the head of an infant or toddler, and minimize this problem.

Support of the head must be accomplished so that the child can remain comfortable and so that the protection can remain effective. Otherwise, a person will have a tendency to ignore the necessity for the safety of the child seat and not proceed with the attachment. It is desired to make the attachment simple and convenient to use in order to encourage its use. But the requirements of the attachments and the simplicity of use are contradictory.

If such a device is simple to use, the question then becomes, is it effective? If it is effective, the question then becomes, is it simple to use? It is desired to maximize the necessary protection, while, at the same time, to achieve the effective use.

SUMMARY OF THE INVENTION

Among the many objectives of this invention is the provision of a child seat for use in a vehicle with a head support.

A further objective of this invention is the provision of a head support for a child vehicle seat, which is easy to use.

Yet a further objective of this invention is the provision of a device to protect a child in a vehicle.

A still further objective of this invention is the provision of a comfortable child head support.

Also, an objective of this invention is the provision of a head support for a toddler.

Another objective of this invention is the provision of a head support for an infant.

Yet another objective of this invention is the provision of a head band support.

Still, another objective of this invention is the provision of a supported bonnet for use on an infant or a child.

A further objective of this invention is the provision of a supported cap for use on an infant or a child.

Yet a further objective of this invention is the provision of a device to minimize any undesired front to back movement of a child's head.

A still further objective of this invention is the minimization undesired side to side movement of a child's head.

Also, an objective of this invention is to provide comfort for an infant or a child riding in a child's seat during a ride in a vehicle.

Another objective of this invention is to provide a simplified method of making an infant or a child comfortable during a ride in a vehicle.

These and other objectives of the invention (which other objectives become clear by consideration of the specification, claims and drawings as a whole) are met by providing a head support to cooperate with an infant seat or a child seat, in order to render the infant or child more comfortable.

BRIEF DESCRIPTION OF THE DRAWINGS

FIG. 7 depicts an exploded view of infant support assembly 100 of this invention.

FIG. 8 depicts a headband 150 suitable for use in infant support assembly 100 or toddler support assembly 170.

FIG. 9 depicts a baseball cap 160 suitable for use in infant support assembly 100 or toddler support assembly 170.

Throughout the figures of the drawings, where the same part appears in more than one figure of the drawings, the same number is applied thereto.

DESCRIPTION OF THE PREFERRED EMBODIMENTS

Figure 1:
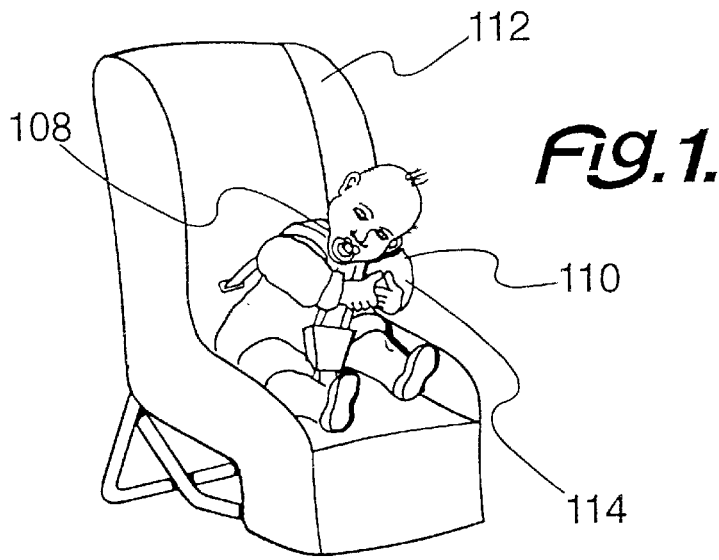
FIG. 1 depicts a perspective view of an infant 110 in a standard car seat 112 undergoing a standard front impact movement 114.

To an infant seat or a toddler seat is added a head support. The head support has side, and preferably chin supports, on opposing sides of a sheet combined with a head covering secured to the sheet.

More particularly, the infant seat has added thereto, an infant head support assembly, which leaves the infant comfortable, while minimizing undesirable head movement forward and back, or side to side. The toddler head support assembly offers the same advantages for the larger child.

As used herein, infant or child may refer to a human being under about eighteen (forty pounds) kilograms in weight. The head support assembly is designed to add to the comfort of such small or young human being, while he or she is riding in a vehicle.

These advantages are achieved by a cap, a head band, a bonnet or similar device being attached to an insert for the car seat, so that head support is provided to the user of the car seat. By cap is meant any type of head covering with at least one bill. By head band is meant a width of cloth or other material adapted to fit around the head, preferably at the forehead, without covering the same. The head covering must be permanently or removably securable to the base sheet.

Any type of head covering or head band can cooperate with the side supports and the base sheet to support the infant or toddler. With the side supports at or adjacent to the neck and the head, or the chin of the infant or toddler, combined with the hat, and the other straps of the seat; good support with comfort and ease of use is obtained.

This cap or the head band can support the head of the child or the toddler in a comfortable position. With the side supports at the neck and adjacent to the chin, combined with the hat, and the other straps of the seat, good support with comfort and ease of use is obtained.

The hat, or other head holder or head covering, is very flexible, but yet it is adjusted to hold the child in a desired fashion. The side supports for the neck, which are on each side of the head and adjacent to or under the chin, permit the child to look around while at the same time support the neck and the head, in order to minimize an undesirable side to side movement, or front to back movement. Thus, the stability and support are achieved in relative comfort.

The cap or other head support may be snapped, sewn, supported or otherwise secured to the base sheet of the head support, in a permanent or a removable fashion. The base sheet has two side supports that fit in the car seat and permit the head and the chin to rest comfortably therebetween. In this fashion, the results of comfort and safety are achieved.

With this comfort and safety, great results are obtained. The child is protected, and the child is comfortable at the same. Combining this structure with the ease of use, the advantages of this device are complete for child or infant safety.

The base of both devices includes a back, and two side pillows. The back is a sheet of material. The pillows support the side of head and have bulges at the bottom thereof, in order to support the chin of the child.

The pillows are formed of resilient material or a appropriate padding, preferably with a durable covering thereover. Such resilient material is commonly used to form a pillow. A shapeable foamed or solid resin or rubber is a padding.

The covering may be any type of cloth or other material, which feels comfortable to the skin. While not required, it is preferred that the covering be durable enough to be washed or otherwise cleaned, and then reused. Preferably, the covering is removable for cleaning purposes.

Between the two side pillows on the base of the head support is secured the cap fastening device or the head band fastening device. The fastening device can be applied to any other head holder. The fastening device may be permanent or releasable. Any fastening device capable of providing comfort may be used to fasten the head holder to the sheet.

Lower straps secure the base sheet of the head support in the car seat and permit the head to be secured in the head support, while providing the desired results and protection for the infant or child. In this fashion, advantages are obtained for the child's protection.

Referring now to FIG. 1, an infant 110 is secured in a standard car seat 112 undergoing a front impact movement 114. By front impact movement 114, is meant the movement which a person riding in a vehicle undergoes, when the vehicle is struck in the front thereof. As it may be seen therein, the neck 108 of the infant 110 is jarred and possibly injured as the infant 110 is thrown forward. Clearly such a movement can place a great stress on the neck 108.

Figure 2:
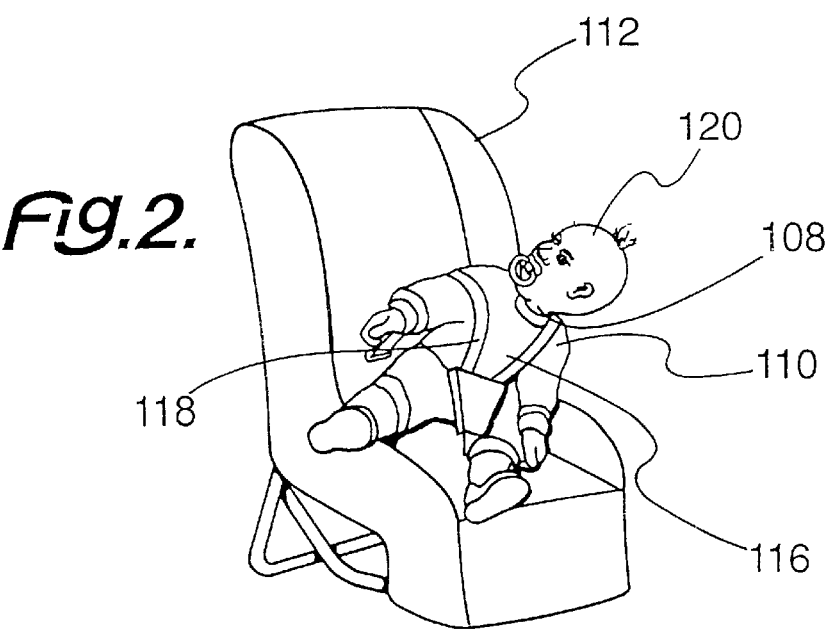
FIG. 2 depicts an infant 110 in a standard car seat 112 undergoing a standard side impact movement 116.

Likewise in FIG. 2, a side impact movement 116 is shown. By side impact movement 116, is meant the movement which a person riding in a vehicle undergoes, when the vehicle is struck in the side thereof. The infant 110 is thrown to the side again providing great stress on the neck 108 of the infant 110.

The standard car seat depicted in FIG. 1 and FIG. 2 has the standard strap assembly 118 feeding over the shoulders and between the legs of the infant 110. However, such a strapping arrangement does not protect the neck 108 of the infant 110, and may result in a relatively uncomfortable ride. That strap assembly 118 may also permit the small head 120 of the infant 110 to bounce around, with any impact.

Figure 3:
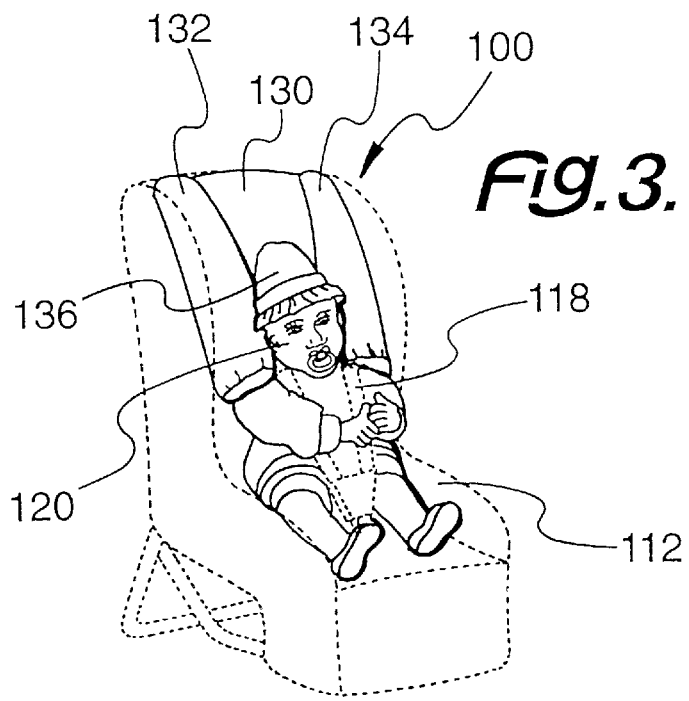
FIG. 3 depicts a front perspective view of an infant support assembly 100 of this invention.

Referring now to FIG. 3, the car seat 112 is modified with the infant support assembly 100 of this invention. The infant support assembly 100 of this invention has an infant base sheet 130. On opposing edges of the infant base sheet 130 are respectively secured a first infant side support 132 and a second infant side support 134. Clearly first infant side support 132 is oppositely disposed on base sheet 130 from second infant side support 134. Secured to the infant base sheet 130, is an infant bonnet 136 with the head 120 comfortably supported.

Figure 4:
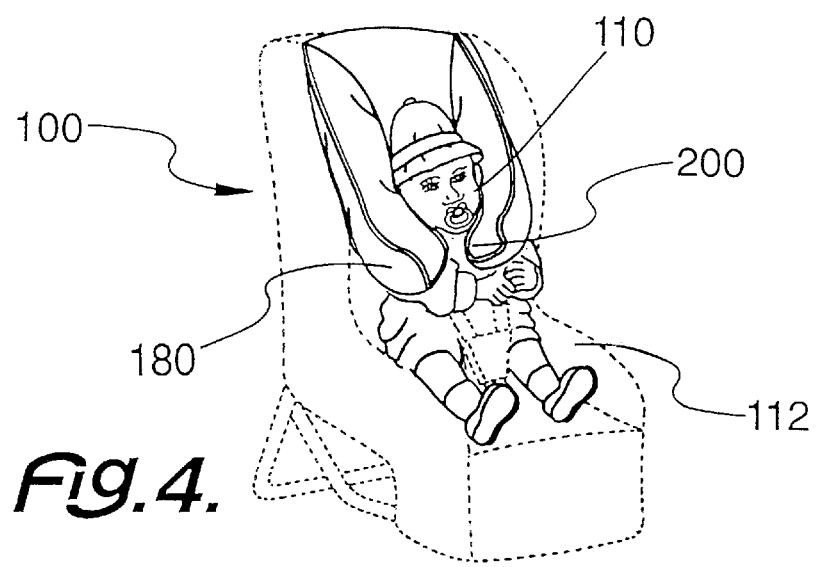
FIG. 4 depicts a perspective view of an infant 110 in a standard car seat 112 modified with an infant support assembly 100 with chin support 200.

Comparing FIG. 4 to FIG. 3, in FIG. 4 and FIG. 7, a preferred form of infant support assembly 100, both first toddler side support 174 and second toddler side support 176 have an enlarged base 180. Enlarged base 180 fits adjacent to the chin of either toddler 168 or infant 100. Enlarged base 180 is formed by increasing the amount of padding 182 and cloth adjacent to the chin. Such a structure provides great comfort for either infant 110 or toddler 168 (FIG. 5).

Padding 182 may be solid or flexible. The resiliency thereof can be determined on a case by case basis. Such a determination is made on an as required or desired basis.

Figure 5:
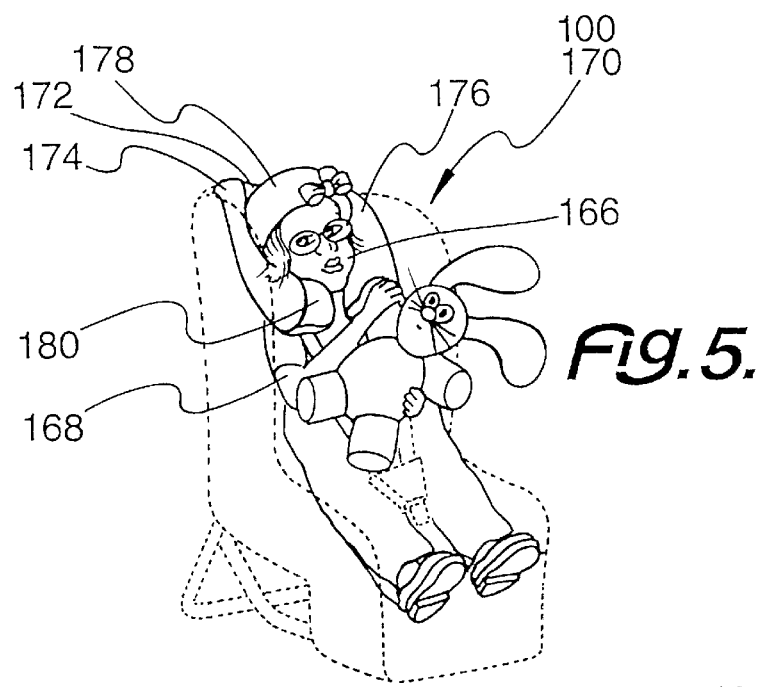
FIG. 5 depicts a perspective view of toddler 168 with a toddler support 170 of this invention mounted in a standard toddler booster 172.

Referring now to FIG. 5, a larger head 166 of a toddler 168 may be comfortably supported by toddler support 170 in a similar fashion. Clearly the size of toddler support 170 relative to the infant support assembly 100 is adjusted to compensate for the relative sizes of either the toddler 168 or the infant 110. However, the structures of toddler support 170 and the infant support assembly 100 are substantially similar, except for a size adjustment.

Enlarged toddler base sheet 172 has secured thereto, in an oppositely disposed fashion, that is on either side 10 thereof, in order to support the head 166 of toddler 168, a first toddler side support 174 and a second toddler side support 176. A headband support 178 supports the toddler 168. The first toddler side support 174 and the second toddler side support 176 have an enlarged base 180 which fits over the respective shoulder of toddler 168. In this fashion, the toddler 168 is supported in a very strong fashion, including support for the larger head 166, including, but not limited to headband restraint 178. The flexibility of the first toddler side support 174 and the second toddler support 176 provides for a strong support.

Figure 6:
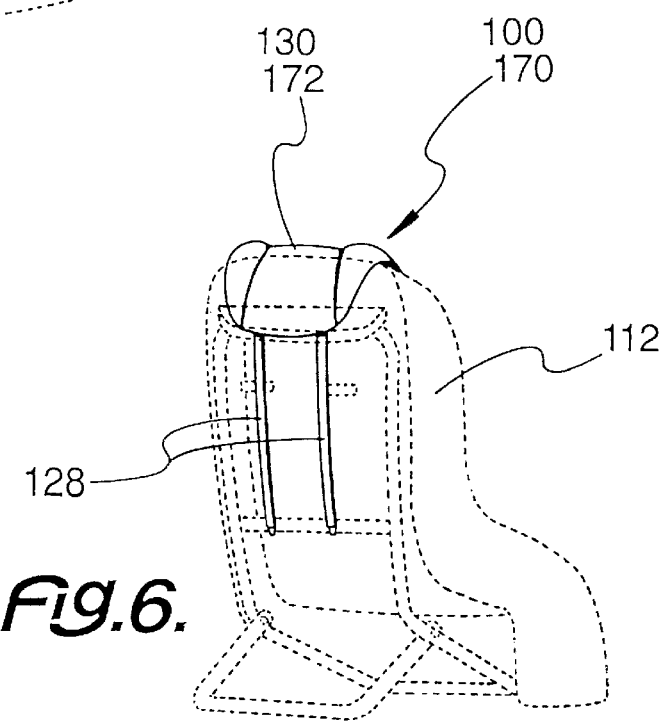
FIG. 6 depicts a rear perspective view of a standard car seat 112 modified with an infant support assembly 100.

Referring now to FIG. 6, the strap assembly 118 for either toddler support assembly 170 or infant support assembly 100 is shown to have strap assembly 118 adapted to cooperate with the seat 110 or the toddle booster 168. The strap assembly 118 is secured to or through the base sheet 172 or 130, and thereby secures the toddler support assembly 170 or the infant support assembly 100, respectively, in the proper position.

Referring now to FIG. 7, with an exploded view of the infant support assembly 100, the head support attachment 190 can be shown. Either a snap 192, or a VELCRO (a registered trademark) for a hook and loop assembly 194 may permanently or removably secure the cap 140 or other head support in the proper position. Other securing mechanisms, such as sewing, are permitted.

As can be seen in FIG. 8 and FIG. 9, either a headband type 150 or a baseball cap 160 respectively can also be used to support .the infant 110. With the snap 192 or VELCRO 194 or other appropriate fasteners, an appropriate support can be achieved for the infant 110.

This application—taken as a whole with the abstract, specification, claims, and drawings being combined—provides sufficient information for a person having ordinary skill in the art to practice the invention as disclosed and claimed herein. Any measures necessary to practice this invention are well within the skill of a person having ordinary skill in this art after that person has made a careful study of this disclosure.

Because of this disclosure and solely because of this disclosure, modification of this method and device can become clear to a person having ordinary skill in this particular art. Such modifications are clearly covered by this disclosure.

What is claimed and sought to be protected by Letters Patent of the United States is:

1. In a seat for use in a vehicle, the seat being adapted to support an infant or a child, the improvement comprising:
   (a) a head support being adapted to cooperate with the seat;
   (b) the head support including a sheet having a first edge and a second edge, a pair of side supports, and a head holder;
   (c) the side supports including a first side support and a second side support;
   (d) the sheet having a first sheet side and a second sheet side;
   (e) the first sheet side having the first side support secured thereto along the first edge of the sheet;
   (f) the second sheet side having the second side support secured thereto along the second edge of the sheet;
   (g) a strap assembly supporting the sheet in the seat; and
   (h) the sheet having the head holder mounted between the first side support and the second side support and the sheet further adapted to support the head of an infant, wherein the first side support has a first enlarged lower portion and the second side support has a second enlarged lower portion, wherein the first and second enlarged lower portions are adapted to cooperate to support at least a chin of the infant or child.

2. The seat for use in a vehicle of claim 1 further comprising:
   (a) the first sheet side being oppositely disposed from the second sheet side; and
   (b) the first side support and the second side support being adapted to support at least one member of a person selected from the group consisting of a chin, a head and a neck.

3. The seat for use in a vehicle of claim 2 further comprising:
   (a) the head holder being selected from the group consisting of a cap, a headband, and bonnet;
   (b) the head holder being adapted to support the head while permitting movement of the head;
   (c) the head holder being permanently or removably secured to the sheet.

4. The seat for use in a vehicle of claim 3 further comprising:
   (a) the first side support and the second side support including a resilient material;
   (b) the first side support and the second side support cooperating with the head holder in order to support the head; and
   (c) the first side support and the second side support being adapted to support opposing sides of the head.

5. The seat for use in a vehicle of claim 4 further comprising:
   (a) the resilient material having a durable covering thereover; and
   (b) the resilient material providing a comfortable feeling for skin.

6. The seat for use in a vehicle of claim 5 further comprising:
   (a) a head holding fastening means being situated between the first side support and the second side support;
   (b) the head holding fastening means receiving the head holder; and
   (c) the head holding fastening means being selected from the group consisting of a permanent fastener and a releasable fastener.

7. The seat for use in a vehicle of claim 6, further comprising:
   the sheet being adapted to support the head of a child having a weight up to about 18 kilograms.

8. The seat for use in a vehicle of claim 6 further comprising:
   (a) the first side support and the second side support including padding with a covering thereover; and
   (b) the padding having a texture selected from the group consisting of solid and flexible.

9. A head support for use with a car seat for a child in a vehicle:
   (a) the head support including a sheet having a first edge and a second edge, a pair of side supports, and a head holder;
   (b) the side supports including a first side support and a second side support;
   (c) the sheet having a first sheet side and a second sheet side;

(d) the first sheet side having the first side support secured thereto along the first edge of the sheet;

(e) the second sheet side having the second side support secured thereto along the second edge of the sheet;

(f) the sheet having the head holder mounted between the first side support and the second side support; and (g) a strap assembly for supporting the sheet in the car seat, the sheet further adapted to support the head of an infant, wherein the first side support has a first enlarged lower portion and the second side support has a second enlarged lower portion, wherein the first and second enlarged lower portions are adapted to cooperate to support at least a chin of the infant or child.

10. The head support of claim 9 further comprising:

(a) the first sheet side being oppositely disposed from the second sheet side; and (b) the first side support and the second side support being adapted to support at least one member of a person selected from the group consisting of a chin, a head and a neck.

11. The head support of claim 10 further comprising:

(a) the head holder being selected from the group consisting of a cap, a headband, and bonnet;

(b) the head holder being adapted to support the head while permitting movement of the head;

(c) the head holder being permanently or removably secured to the sheet.

12. The head support of claim 11 further comprising:

(a) the first side support and the second side support including a resilient material;

(b) the first side support and the second side support cooperating with the head holder in order to support the head; and (c) the first side support and the second side support being adapted to support opposing sides of the head.

13. The head support of claim 12 further comprising:

(a) the resilient material having a durable covering thereover; and (b) the resilient material providing a comfortable feeling for skin.

14. The head support of claim 13 further comprising:

(a) a head holding fastening means being situated between the first side support and the second side support;

(b) the head holding fastening means receiving the head holder; and (c) the head holding fastening means being selected from the group consisting of a permanent fastener and a releasable fastener.

15. The head support of claim 14, further comprising:

the sheet being adapted to support the head of a child having a weight up to about 18 kilograms.

16. The head support of claim 14 further comprising:

(a) the first side support and the second side support including padding with a covering thereover; and (b) the padding having a texture selected from the group consisting of solid and flexible.

* * * * *